US007609403B2

(12) United States Patent
Ishibashi et al.

(10) Patent No.: US 7,609,403 B2
(45) Date of Patent: Oct. 27, 2009

(54) PRINTING DEVICE WITH MULTIPLE RECORDING AGENT CARTRIDGES AND CORRESPONDING PRINT MANAGEMENT METHOD

(75) Inventors: Osamu Ishibashi, Nagano-ken (JP); Ken Yoshizuka, Nagano-ken (JP); Keiichi Taguchi, Nagano-ken (JP); Hiroshi Tanaka, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 912 days.

(21) Appl. No.: 11/146,277

(22) Filed: Jun. 7, 2005

(65) Prior Publication Data

US 2006/0153586 A1   Jul. 13, 2006

(30) Foreign Application Priority Data

Jun. 7, 2004   (JP)   ............................. 2004-168690

(51) Int. Cl.
G06F 3/12   (2006.01)
(52) U.S. Cl. .................................... 358/1.15; 358/1.13
(58) Field of Classification Search ................ 358/1.15, 358/1.12, 1.13; 709/229
See application file for complete search history.

(56) References Cited

U.S. PATENT DOCUMENTS 5,933,584 A * 8/1999 Maniwa ...................... 358/1.15
6,714,313 B1 * 3/2004 Sugaya ....................... 358/1.15
6,785,727 B1 * 8/2004 Yamazaki .................... 709/229
6,807,380 B2 * 10/2004 Iida et al. ...................... 399/12
6,903,836 B2 * 6/2005 Meade et al. ................ 358/1.15
2005/0108032 A1 * 5/2005 Josephsen et al. .............. 705/1
2005/0286077 A1 * 12/2005 Ishibashi et al. ............ 358/1.15

FOREIGN PATENT DOCUMENTS

JP   2003-260853 A   9/2003
JP   2003-316106 A   11/2003

* cited by examiner

Primary Examiner—Benny Q Tieu
Assistant Examiner—Jeremiah A Bryar
(74) Attorney, Agent, or Firm—Sughrue Mion, PLLC (57) ABSTRACT

An object of the present invention is to simplify management of the amount of recording agent used by multiple users, by allocating a recording agent cartridge to a user in advance. In a printing device of the present invention, a primary user and a secondary user are set as active user information for each of multiple recording agent cartridges in a printing device connected to a network. When a print job with user identification information is received via the network, the printing device specifies a cartridge of which the primary user is the user who sent the job, based on the user identification information and the active user information, and determines whether the residual amount in the specified cartridge is sufficient (S50). When the residual amount is not sufficient, the procedure specifies another cartridge for which the user is set as the secondary user, based on the user identification information and the active user information, and set the specified cartridge as a active cartridge to be used for printing (S80).

9 Claims, 8 Drawing Sheets

PRIMARY USERS AND SECONDARY USERS OF EACH CARTRIDGE

| CARTRIDGE | | 32A | 32B | 32C | 32D |
|---|---|---|---|---|---|
| PRIMARY USER | | A | B | C | D |
| SECONDARY USER | A | — | NOT PERMITTED | NOT PERMITTED | PERMITTED |
| | B | PERMITTED | — | NOT PERMITTED | NOT PERMITTED |
| | C | PERMITTED | PERMITTED | — | NOT PERMITTED |
| | D | PERMITTED | PERMITTED | NOT PERMITTED | — |

"PERMITTED" means that the user is set as a secondary user, and "NOT PERMITTED" means that the user is not set as a secondary user.

Fig. 8

PRIMARY AND SECONDARY USER CARTRIDGES FOR EACH USER

| | USER | A | B | C | D |
|---|---|---|---|---|---|
| USABLE CARTRIDGES | 32A | PRIMARY | 1 | 1 | 1 |
| | 32B | NOT PERMITTED | PRIMARY | 2 | 2 |
| | 32C | NOT PERMITTED | NOT PERMITTED | PRIMARY | NOT PERMITTED |
| | 32D | 1 | NOT PERMITTED | NOT PERMITTED | PRIMARY |

The numbers in the columns indicate the order of priority usage of secondary user cartridges

Fig. 9

TONER USAGE AMOUNT OF SECONDARY USER FOR EACH CARTRIDGE

| CARTRIDGE | | 32A | 32B | 32C | 32D |
|---|---|---|---|---|---|
| PRIMARY USER | | A | B | C | D |
| SECONDARY USER | A | — | NOT PERMITTED | NOT PERMITTED | 0 PAGES |
| | B | 5 PAGES | — | NOT PERMITTED | NOT PERMITTED |
| | C | 2 PAGES | 0 PAGES | — | NOT PERMITTED |
| | D | 0 PAGES | 2 PAGES | NOT PERMITTED | — |

PRINTING DEVICE WITH MULTIPLE RECORDING AGENT CARTRIDGES AND CORRESPONDING PRINT MANAGEMENT METHOD

This application claims priority from Japanese Patent Application No. 2004-168690 filed on Jun. 7, 2004, in the Japanese Patent Office, the disclosure of which is incorporated herein by reference.

BACKGROUND OF THE INVENTION

1. Field of the Invention

The present invention relates to a printing device and to a print management method.

2. Description of the Related Art

This type of printing device has been proposed in JP-A No. 2003-260853, for example, in which accurate billing processing for a recording agent or other consumable is performed when a printing device is shared in a network.

SUMMARY OF THE INVENTION

However, correctly detecting the amount of the recording agent used by each user and performing billing processing involves complex processing. There is also no reduction of the clerical processing involved in billing.

Therefore, an object of the printing device, print management system, and print management method of the present invention is to make it easier to manage the used amount of recording agent by assigning a usable recording agent cartridge to a user in advance when a printing device is used by multiple users connected via a network. Another object of the printing device, print management system, and print management method of the present invention is to enable easy adaptation even when there is an insufficient amount of the recording agent assigned to a user. Yet another object of the printing device, print management system, and print management method of the present invention is to manage the amount of recording agent used while minimizing billing processing.

In order to achieve at least part of the aforementioned objects, a printing device and a print management method of the present invention are constructed as follows.

The present invention is directed to a printing device which is connected to a network and which executes a print job using any of multiple recording agent cartridges mounted therein. The printing device includes: an active user information setting module that sets a primary user for each of the multiple recording agent cartridges and a secondary user for at least one of the recording agent cartridges, as active user information; a residual amount deficiency detection module that detects residual amount deficiency of toner for each of the multiple recording agent cartridges; and an active recording agent cartridge setting module. The active recording agent cartridge setting module, when a print job with user identification information is received from a user via the network, specifies a main recording agent cartridge for which the user is the primary user based on the active user information and the user identification information received with the print job. In case where residual amount deficiency is not detected with respect to the main recording agent cartridge by the residual amount deficiency detection module, the active recording agent cartridge setting module sets the specified main recording agent cartridge as an active recording agent cartridge for print execution. In case where residual amount deficiency is detected with respect to the main recording agent cartridge, on the other hand, the active recording agent cartridge setting module specifies secondary recording agent cartridges for which the user is a secondary user based on the active user information and the user identification information and sets one of the specified secondary recording agent cartridge as the active recording agent. The printing device also includes a print job execution module that executes the print job using the active recording agent cartridge.

In one embodiment of the present invention, the printing device of the invention further includes a recording agent usage information storage module that stores recording agent usage information that includes cartridge identification information for identifying a main recording agent cartridge for which a user is the primary user, user identification information for identifying a user, and recording agent usage amount relation information relating to the amount of recording agent used in a print job, when the print job is executed by the print job execution module using the secondary recording agent cartridge as the active recording agent cartridge. The active recording agent cartridge setting module, prior to the detection of residual amount deficiency with respect to the main cartridge by the residual amount deficiency detection module, judges whether recording agent usage information with respect to the main recording agent cartridge is stored in the recording agent usage information storage module, based on the cartridge identification information of the main recording agent cartridge. In case where recording agent usage information with respect to the main cartridge is stored in the recording agent usage information storage module, the active recording agent setting module determines a recording agent cartridge for which a user corresponding to the user identification information included in the recording agent usage information is the primary user, based on the active user information and the recording agent usage information, and sets the determined recording agent as the active recording agent cartridge. In case where recording agent usage information with respect to the main cartridge is not stored in the recording agent usage information storage module, on the other hand, the active recording agent cartridge setting module determines whether the residual amount deficiency is detected with respect to the main recording agent cartridge to set the active recording agent cartridge. In this embodiment, the printing device may further include an information updating module that, after the active recording agent cartridge setting module sets the active recording agent cartridge and the print job execution module executes the print job using the active recording agent cartridge, updates the recording agent usage information stored in the recording agent usage information storage module with respect to the active recording agent cartridge based on details of the executed print job.

In the printing device of the invention, in case where multiple recording agent cartridges are provided as the secondary recording agent cartridges for the user, a priority sequence may be set for use of the multiple recording agent cartridges. The active recording cartridge setting module may preferentially select a recording agent cartridge for which a user having the same or similar type of attributes as the user who has sent the print job is the primary user, among the multiple cartridges, and set the selected recording agent cartridge as the active recording agent cartridge. The active recording cartridge setting module may preferentially select a recording agent cartridge which has the shortest distance to a preset position for a recording agent cartridge to be used for the print execution, and sets the selected recording agent cartridge as the active recording agent cartridge.

In the printing device of the invention, the active recording agent cartridge setting module may set an active recording agent cartridge for each page to be printed in the print job.

The printing device of the invention may further include an active user information inputting module that inputs the active user information.

The present invention is also directed to a print management system including multiple terminal devices connected to a network, a printing device which is connected to the network and which executes a print job using any of multiple recording agent cartridges mounted therein, and a management device for managing the printing device. The printing device in the print management system includes: an active user information setting module that sets a primary user for each of the multiple recording agent cartridges and a secondary user for at least one of the recording agent cartridges, as active user information; an active user information acquiring module; a residual amount deficiency detection module that detects residual amount deficiency of toner for each of the multiple recording agent cartridges; and an active recording agent cartridge setting module. When a print job with user identification information is received from a user via the network, the active recording agent cartridge setting module specifies a main recording agent cartridge for which the user is the primary user based on the active user information and the user identification information received with the print job. In case where residual amount deficiency is not detected with respect to the main recording agent cartridge by the residual amount deficiency detection module, the active recording agent cartridge sets the specified main recording agent cartridge as an active recording agent cartridge for print execution. In case where residual amount deficiency is detected with respect to the main recording agent cartridge, on the other hand, the active recording agent cartridge specifies secondary recording agent cartridges for which the user is a secondary user based on the active user information and the user identification information to set one of the specified secondary recording agent cartridge as the active recording agent. The printing device in the print management system further includes a print job execution module that executes the print job using the active recording agent cartridge.

The present invention is further directed to a print management method for a printing device which is connected to a network and which executes a print job using any of multiple recording agent cartridges mounted therein. The print management method including the steps of: detecting residual amount deficiency of toner for each of the multiple recording agent cartridges; when a print job with user identification information is received from a user via the network, referring to the user identification information received with the print job and an active user information including settings of a primary user for each of the multiple recording agent cartridges and a secondary user for at least one of the recording agent cartridges, to specify a main recording agent cartridge for which the user is the primary user, and detecting residual amount deficiency of toner with respect to the specified main cartridge. In case where residual amount deficiency is not detected with respect to the main recording agent cartridge, the print management method sets the specified main recording agent cartridge as an active recording agent cartridge for print execution. In case where residual amount deficiency is detected with respect to the main recording agent cartridge, on the other hand, the print management method specifies secondary recording agent cartridges for which the user is a secondary user based on the active user information and the user identification information and setting one of the specified secondary recording agent cartridge as the active recording agent. The print management method further includes the step of executing the print job using the active recording agent cartridge.

DESCRIPTION OF THE PREFERRED EMBODIMENTS

Figure 1:
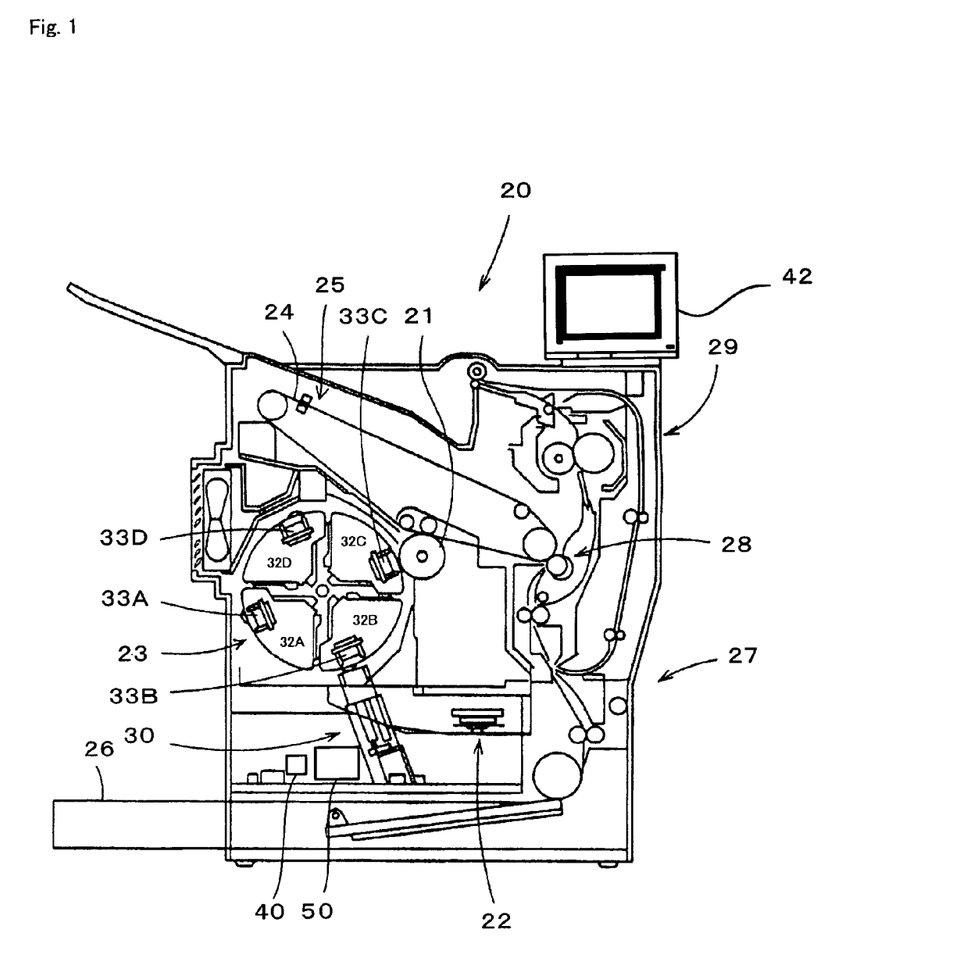
FIG. 1 schematically illustrates a printing device according to one embodiment of the present invention.
Figure 2:
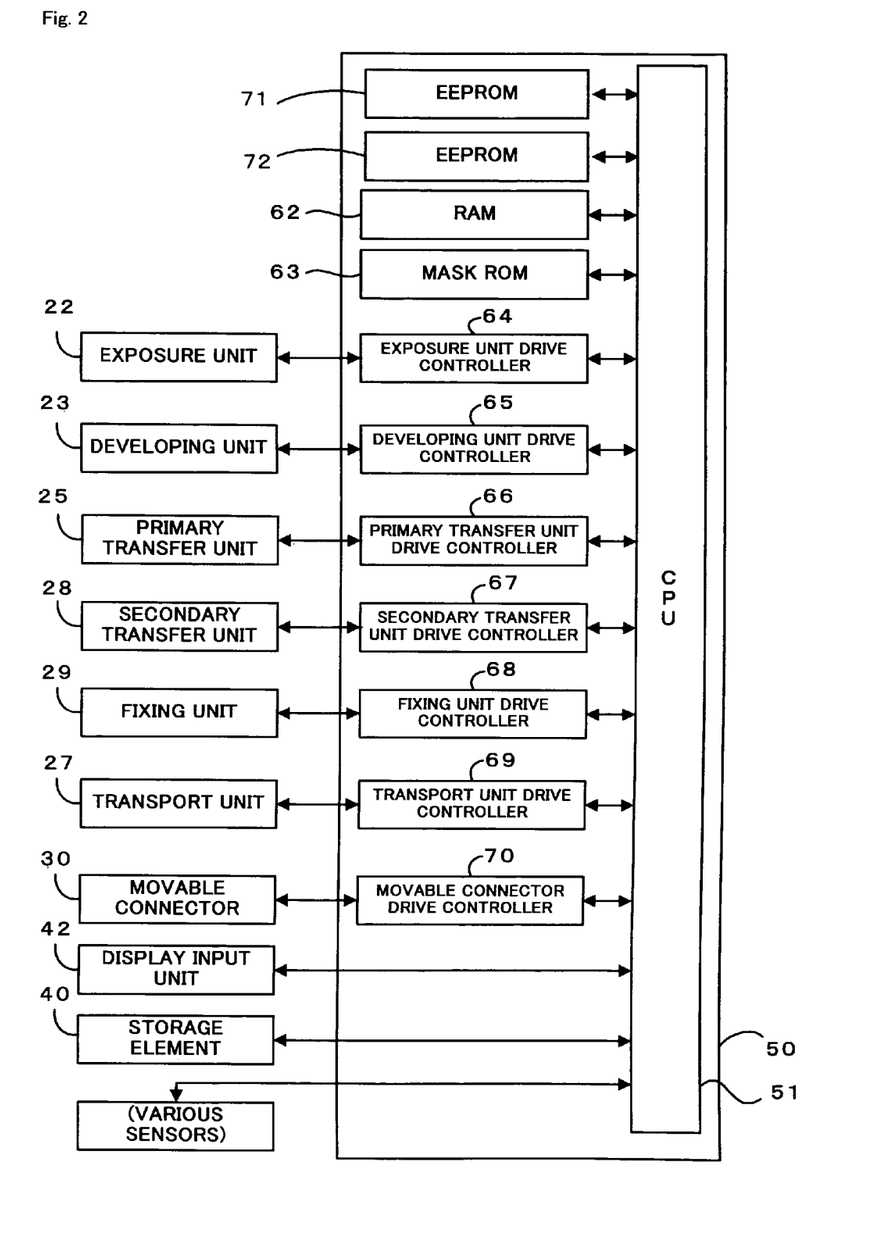
FIG. 2 is a block diagram showing construction of controller and other units in the printing device.
Figure 3:
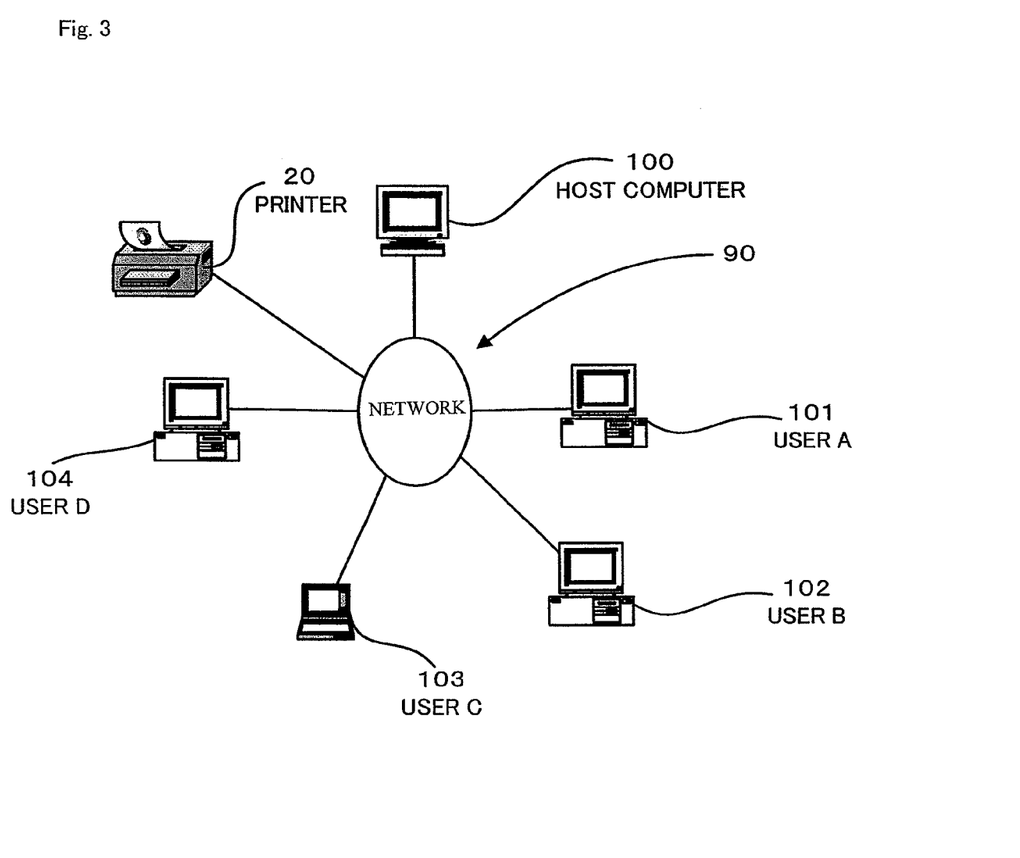
FIG. 3 is a diagram showing the entire network that includes the printing device.

Preferred embodiments for implementing the present invention will next be described using examples. FIG. 1 schematically illustrates a printing device 20 according to a first embodiment of the present invention; and FIG. 2 is a block diagram showing the input and output of the control signal in the controller 50 of the printing device 20 of the embodiment. FIG. 3 is a diagram showing the entire network that includes the printing device 20.

The printing device 20 of the present embodiment is a monochrome laser printer. This printing device 20 is configured as a monochrome xerographic printing device that employs a single-photoreceptor system and an intermediate transfer system, and is provided with an exposure unit 22 for forming an electrostatic latent image of the image to be printed by emitting a laser onto a charged photoreceptor 21; a total of four toner cartridges 32A, 32B, 32C, and 32D (hereinafter indicated as 32A through 32D) all containing black toner; a developing unit 23 for developing the electrostatic latent image formed on the photoreceptor 21 as a toner image using the black toner fed from any of the toner cartridges 32A through 32D; a primary transfer unit 25 for superposing and transferring the toner image thus developed on the photoreceptor 21 onto a transfer belt 24 and forming a color toner image; a transport unit 27 for transporting paper stock from a paper stock cassette 26; a secondary transfer unit 28 for transferring the toner image formed on the transfer belt 24 to the paper stock thus transported; a fixing unit 29 for fusing the color toner image transferred onto the paper stock to the paper stock and discharging the paper; a movable connector 30 for forming a connection with storage elements 33A, 33B, 33C, and 33D (hereinafter indicated as 33A through 33D) attached to the toner cartridges 32A through 32D during the rotation of the developing unit 23 and reading or writing the expiration date, the initial residual amount of toner, the residual amount of toner, or other information relating to the cartridge; a storage element 40 for storing the information of the storage elements 33A through 33D that has been read via the movable connector 30; a display input unit 42 for displaying various types of information relating to the printing device 20 and allowing a user to input settings to the printing device 20; and a controller 50 for controlling the operation of the entire printing device 20 thus configured, as shown in FIG. 1. The printing device 20 is also provided with a counter not shown in the drawing for counting the number of prints on various sizes of media. In this example, a description is given of a printing device that employs a single-photoreceptor system and an intermediate transfer system, but a tandem system having a photoreceptor and developing unit for each toner cartridge, or other configuration may also be adopted.

The storage elements 33A through 33D mounted on the toner cartridges 32A through 32D, respectively, may be provided so as to be attached in advance or capable of being attached to the toner cartridges 32A through 32D as CSIC (Customer Specific Integrated Circuit) chips or the like.

The storage element 40 stores cartridge-related information including initial toner residual amount which is read via the movable connector 30, and other information such as used amount and residual amount of toner which are calculated by the controller 50, with respect to each cartridge in relation with the cartridge identification information. The storage element 40 stores these items of cartridge identification information, as well as active user information and toner usage information that are described below in detail.

The display input unit 42 of the printing device 20 is formed so that the active user information can be input/set. Specifically, a primary user and a secondary user can be set for each of the toner cartridges 32A through 32D mounted in the printing device 20. The term "primary user" used herein refers to the user from whom charges will be assessed for the toner cartridge. The term "secondary user" refers to a user who is not a primary user of a cartridge and is permitted to use the cartridge, to which another user is set to be the primary user, under certain conditions such as a toner-out condition. Specifically, insofar as a toner-out condition or particular situation described hereinafter does not exist, a user executes his or her own print job using the cartridge for which he or she is set as the primary user. There is at least one "primary user" for each cartridge, and there may be two or more "primary users" for each cartridge. There is not necessarily a "secondary user" set for each cartridge, and one may be set for at least one of the cartridges, or two or more secondary users may be set for one cartridge.

When a user is set to be a secondary user for multiple cartridges via the display input unit 42, a priority sequence in the multiple cartridges can be determined for use of the multiple cartridges. For example, in this printing device 20, a primary user is set for each of all the cartridges 32A through 32D, and a secondary user is set for each of the cartridges 32A, 32B, and 32D via the display input unit 42.

As shown in FIG. 2, the controller 50 is composed of a microprocessor centered around a CPU 51, RAM 62, mask ROM 63, and EEPROM 71 and 72; various types of input signals and input signals from various types of sensors are inputted thereto via signal lines, and the controller controls the operation of the exposure unit 22, the developing unit 23, the primary transfer unit 25, the secondary transfer unit 28, the fixing unit 29, the transport unit 27, the movable connector 30, the display input unit 42, and other components of the printing device 20 based on these input signals via the exposure unit drive controller 64, the development unit drive controller 65, the primary transfer unit drive controller 66, the secondary transfer unit drive controller 67, the fixing unit drive controller 68, the transport unit drive controller 69, the movable connector drive controller 70, and other components, and controls reading and writing of various types of information from the storage elements 33A through 33D attached to the toner cartridges 32A through 32D.

The mask ROM 63 stores a program for executing printing by using the active cartridge, which is ultimately set to be used for printing, when a print job with user identification information is received. The EEPROM 71 stores a program for receiving the print job with user identification information, determining the primary cartridge of the user, and setting the cartridge to the active cartridge.

The storage element 40 stores the active user information set for each of the toner cartridges 32A through 32D via the display input unit 42. The active user information is used to set an active cartridge for a print job during the print execution process.

Figure 7:
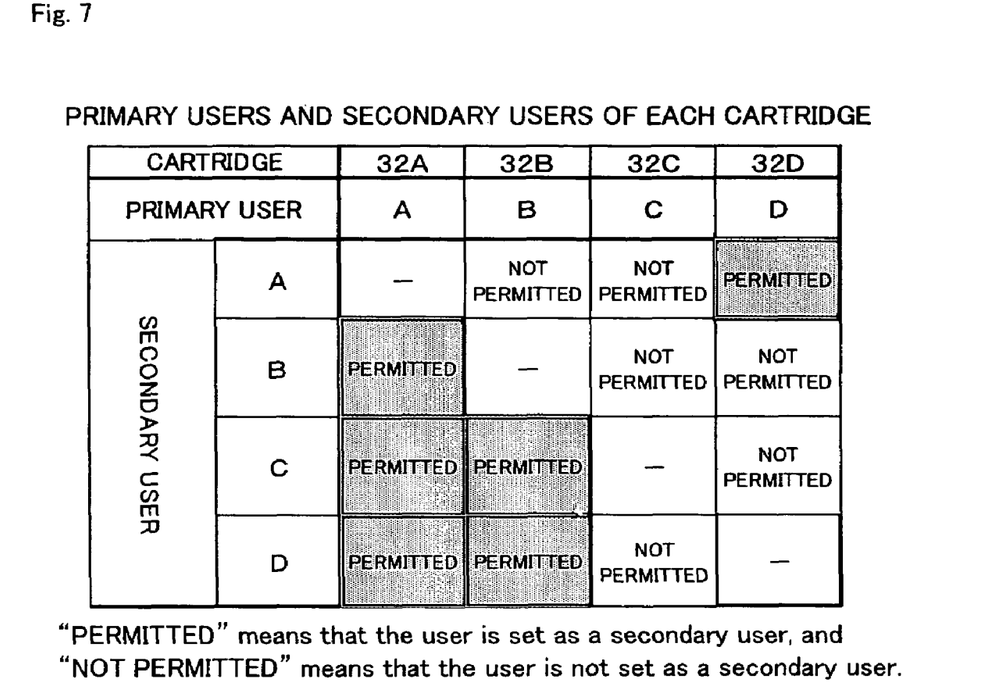
FIG. 7 is a diagram showing an example of the active user information.
Figure 8:
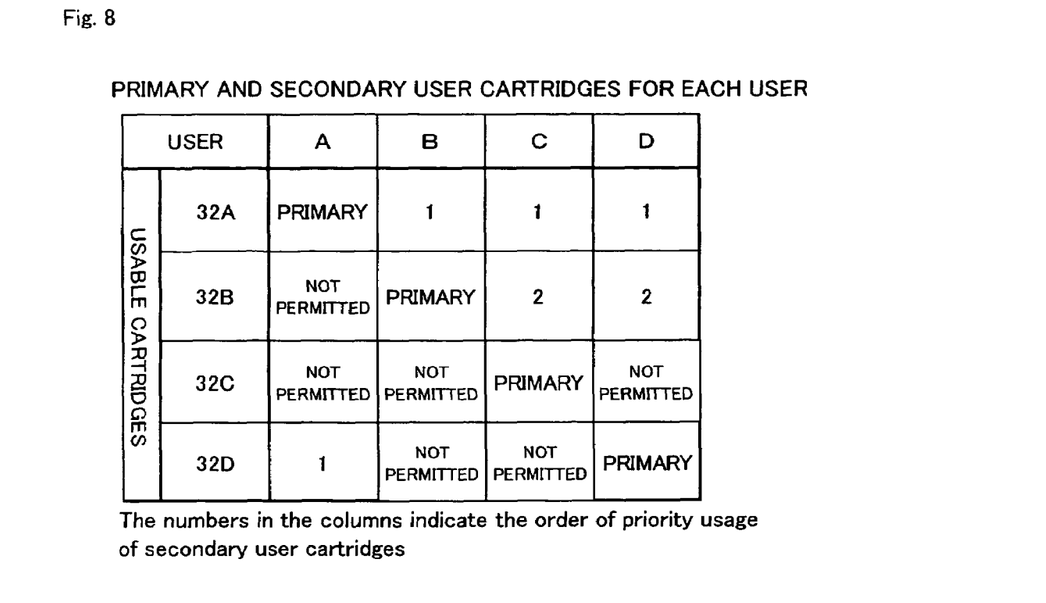
FIG. 8 is a diagram showing an example of usable cartridges with respect to each user.

An example of the relationship between cartridges 32A through 32D and users A through D is shown in FIGS. 7 and 8.

In FIG. 7, the primary user and secondary users are shown for cartridges 32A through 32D in the vertical columns. In FIG. 8, the primary user cartridge for each user and other cartridges that are the secondary user cartridges are shown under the users in each column. FIG. 8 also shows, for each user, a priority sequence for the use of secondary cartridges when a user is set to be a secondary user for multiple cartridges.

In the relationship shown in FIG. 7, user A is designated as the primary user for cartridge 32A, and users B, C, and D are designated as the secondary users for the cartridge 32A; user B is designated as the primary user for cartridge 32B, and users C and D are designated as the secondary users for the cartridge 32B; user C is designated as the primary user for cartridge 32C, and no secondary users are designated for the cartridge 32C; and user D is designated as the primary user for cartridge 32D, and user A is designated as the secondary user for the cartridge 32D. These settings of the primary user and the secondary user of respective cartridges determines usable cartridges with respect to each user as shown in FIG. 8.

As previously mentioned, the storage element 40 stores the residual amount of toner in the cartridges 32A through 32D. Furthermore, the cartridge used, the user identification information of the secondary user, and the amount of toner used are stored as toner usage information when a secondary user uses any of the cartridges 32A through 32D to execute a print job. The toner usage information is also updated after execution of printing. The amount of toner used in the toner usage information may be defined, for example, by the number of sheets of paper when a certain number of characters are included in an A4-size sheet of paper, the dot count, the number of rotations of the developing roller, or another method of expressing this amount in a scale that can correspond to the amount of toner used.

As shown in FIG. 3, the printing device 20 thus configured is connected to a LAN (Local Area Network) or other network 90, and is configured so as to be capable of data exchange with a host computer 100 or client computers 101, 102, 103, and 104. The client computers 101, 102, 103, and 104 of the users set as the primary users of the toner cartridges 32A through 32D of the printing device 20 are connected to the printing device 20.

The print execution process performed when a print job is received from a user will next be described with reference to FIGS. 4 through 9.

Figure 4:
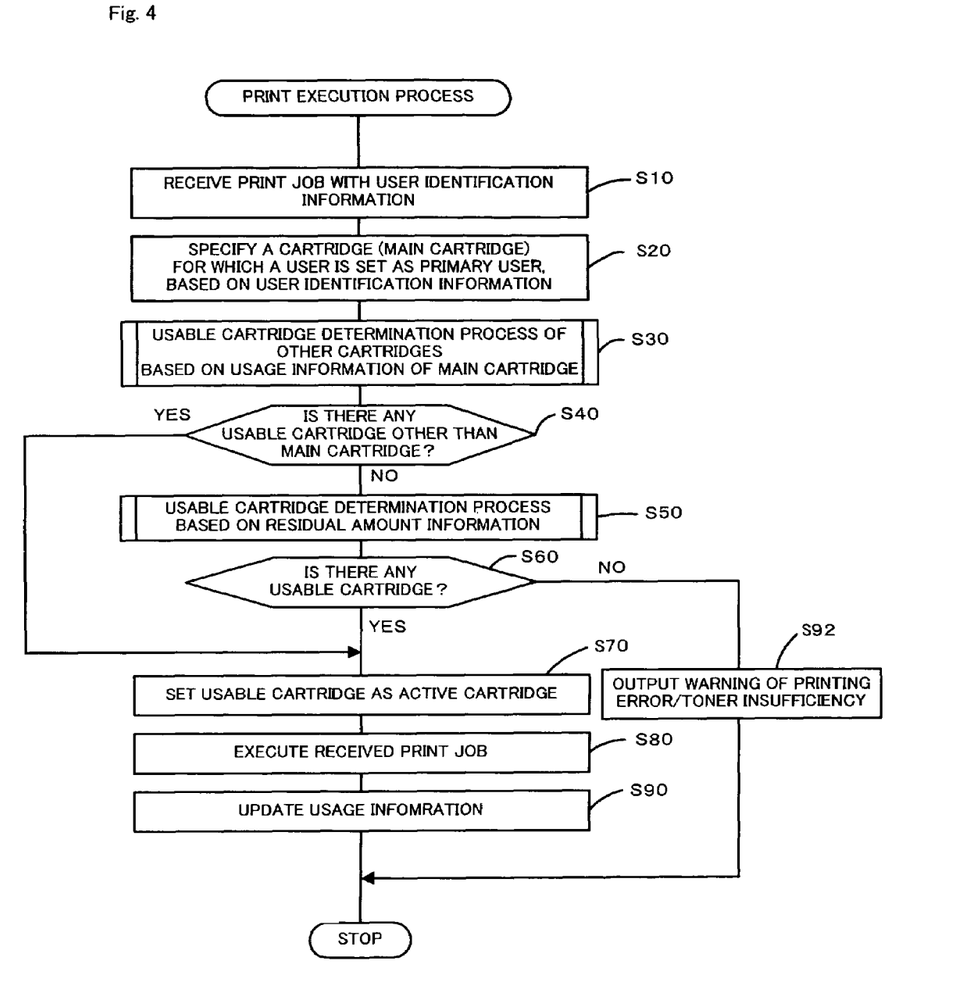
FIG. 4 is a flowchart showing an example of the print execution process.
Figure 5:
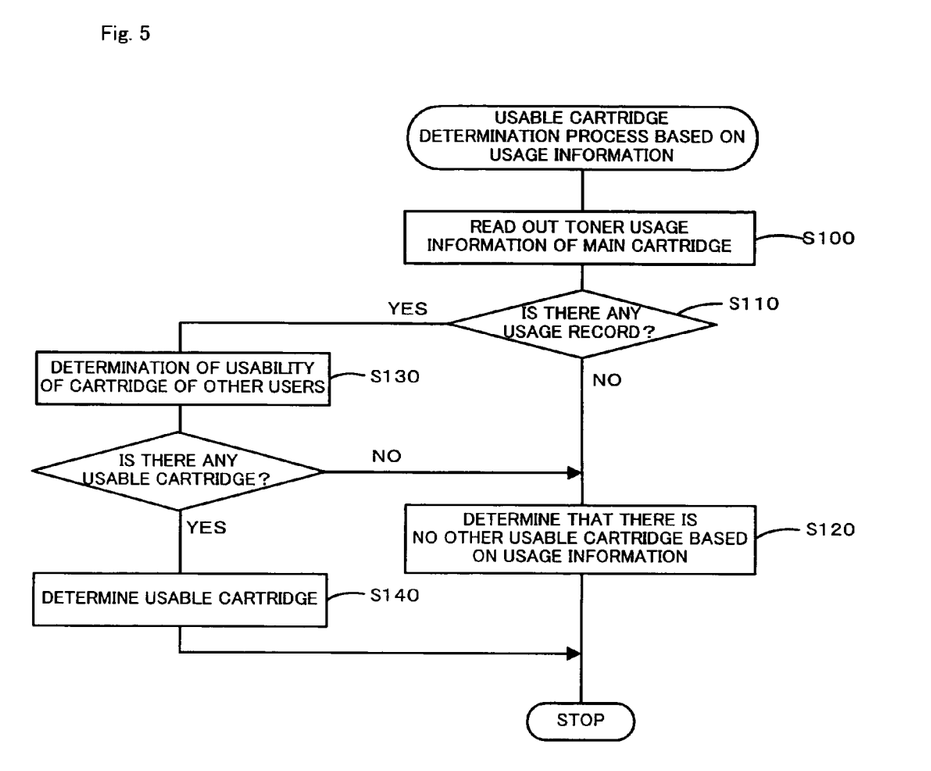
FIG. 5 is a flowchart showing an example of a usable cartridge determination process based on the usage information.
Figure 6:
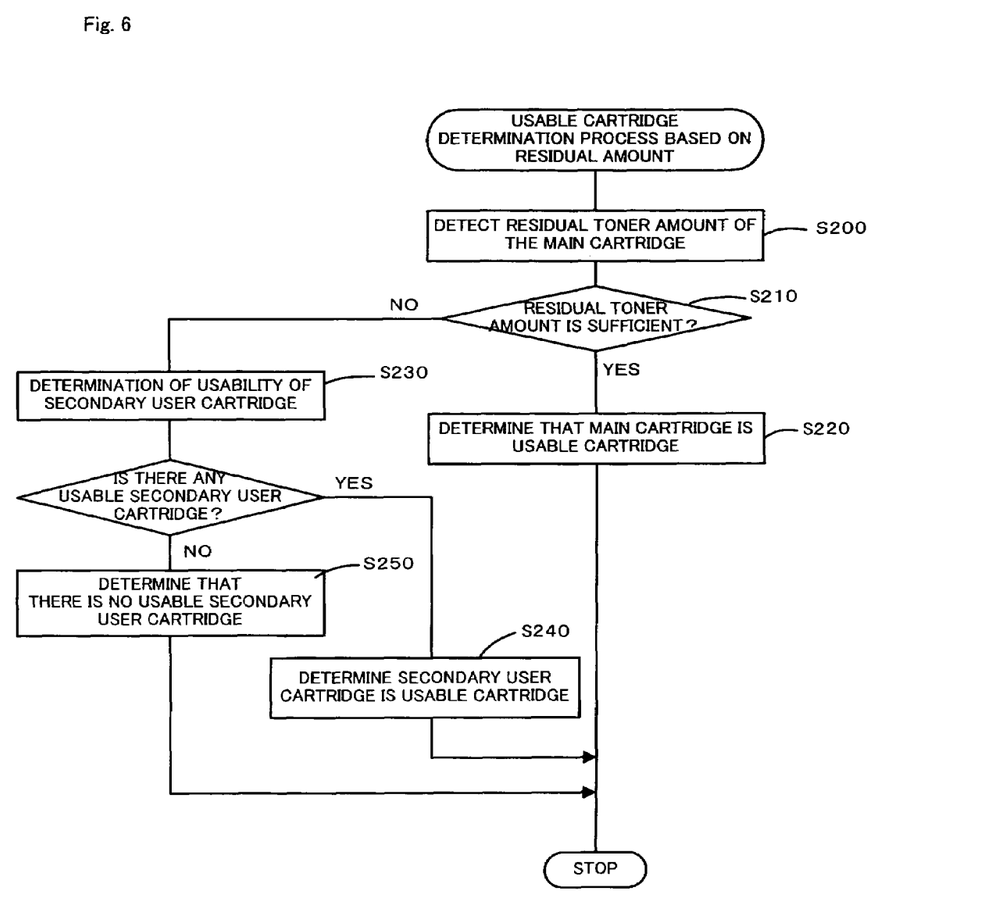
FIG. 6 is a flowchart showing an example of a usable cartridge determination process based on the residual amount of toner.
Figure 9:
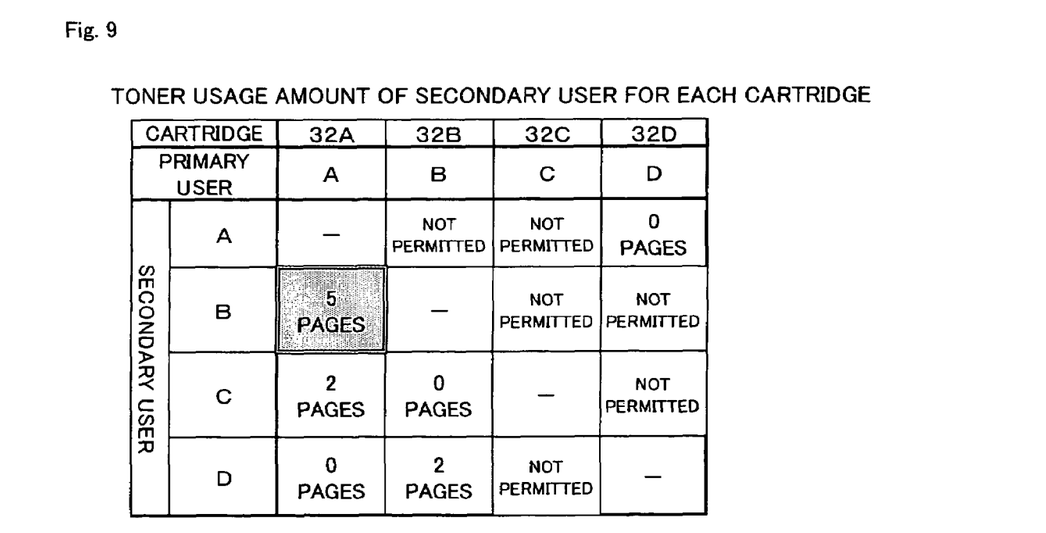
FIG. 9 is a diagram showing an example of the toner usage information.

FIG. 4 is a flowchart showing an example of the print execution process that is executed by the controller 50 in the printing device 20; FIG. 5 is a flowchart showing an example of a usable cartridge determination process based on the usage information described in FIG. 9; FIG. 6 is a flowchart showing an example of a usable cartridge determination process based on the residual amount of toner in the cartridge;

FIG. 7 is a diagram showing an example of the active user information that is the relationship between the user and the cartridge set in the printing device 20; FIG. 8 is a diagram showing an example of a cartridge that can be used by a user in the printing device 20; and FIG. 9 is a diagram showing an example of the toner usage information in the printing device 20.

In the print process as shown in FIG. 4, the procedure first receives a print job from a user (hereinafter referred to as the main user) via the network 90 (step S10). When the print job is accompanied by user identification information, the CPU 51 specifies a cartridge (the primary user cartridge, hereinafter referred to as the main cartridge) for which the main user is set as the primary user, based on the active user information which is stored in advance in the EEPROM 72 and read to the RAM 62 and the user identification information received with the print job (step S20). The CPU 51 subsequently executes a usable cartridge determination process described below to determine whether there is any usable cartridge other than the main cartridge, based on the toner usage information of other users who are set as secondary users for the main cartridge (step S30).

As shown in FIG. 5, in the usable cartridge determination process based on the toner usage information (step S30), the procedure first reads out toner usage information with respect to the main cartridge from EEPROM 72 (step A100), and detects a usage record of the toner of the main cartridge used by a secondary user of the main cartridge (step S110). When the amount of toner used by the other user is "0" for the main cartridge, that is, there is no usage record by the secondary user in the toner usage information with respect to the main cartridge in step S110, the procedure determines that there is no cartridge that can be used other than the main cartridge, based on the toner usage information (step S120), and terminates the process. For example, in case where the main user is user D, the usage amount of for user A (who is the only secondary user of the cartridge 32D) is 0 pages, and it is thus determined that there is no toner usage record in the toner usage information.

When there is any usage record by a secondary user in the toner usage information with respect to the main cartridge in step S110, on the contrary, the procedure specifies a cartridge for which the secondary user of the main cartridge is the primary user, and determines whether the specified cartridge is usable (step S130). When there is one secondary user for the main cartridge and the residual amount of toner in the cartridge of the secondary user is at or above a certain value, the procedure sets the cartridge as a usable cartridge (step S140), and terminates the usable cartridge determination process based on toner usage information. When there are multiple secondary users for the main cartridge, the procedure determines whether there is any cartridge usable among the cartridges for which the multiple secondary users are set as the primary users, in order of toner usage amount of the main cartridge by the multiple other users, and sets the usable cartridge (step S140). For example, in case in the toner usage information in FIG. 9, in case where the main user is the user A, the amount used by each of the multiple. secondary users is recorded with respect to the cartridge 32A as the main cartridge, and the amount used by user B is the highest. Therefore, cartridge 32B is set as a usable cartridge insofar as the amount of toner in the cartridge 32B of user B is sufficient to execute the print job.

When the cartridges of all the secondary users are not usable due to insufficient toner because of not yet having been exchanged or for some other reason while there is usage record by other users in the toner usage information, the procedure determines that there are no other usable cartridges other than the main cartridge (step S120), and terminates the usable cartridge determination process based on the toner usage information.

After the usable cartridge determination process based on toner usage information (step S30) the procedure judges whether there is a usable cartridge other than the maim cartridge (step S40). When there is a usable cartridge other than the main cartridge, the procedure sets the usable cartridge to an active cartridge which is to be used to execute the print job (step S70), and executes the received print job using the active cartridge (step S80). This configuration allows for management on the basis of the main cartridge as a unit that the primary user is supposed to use, and the amount of toner used by another user can be promptly balanced out by executing the print job without billing processing.

When it is judged that there is no usable cartridge other than the main cartridge in step S40, on the other hand, the procedure executes a usable determination process based on the residual amount of toner in the main cartridge to determine whether there is any usable cartridge, based on the residual amount of toner in the main cartridge (step S50).

As shown in FIG. 6, in the usable cartridge determination process based on the residual amount of toner in the main cartridge (step S50), the procedure judges whether the residual amount of toner in the main cartridge is at or above a certain value. Specifically, the procedure first reads out the residual toner amount in the main cartridge, which is stored in the storage element 40 (step S200), and judges whether the residual toner amount thus read is at or above a predetermined value (step S210). When the residual toner amount is at or above the predetermined value, the procedure determines that toner is remaining, sets the main cartridge as a usable cartridge (step S220), and terminates the usable cartridge determination process based on this residual toner amount. This configuration described above allows for management of toner usage amount by each user with respect to each of the toner cartridges and simplifies management of the toner amount consumed during use of the printing device 20 by multiple users.

When the residual toner amount in the main cartridge is not at or above the predetermined value, on the other hand, the procedure determines that toner amount is insufficient and that the main cartridge is not usable (step S220) and retrieves a cartridge for which the main user is set as the secondary user (step A230). Specifically, the procedure judges whether there is any cartridge for which the main user is set as the secondary user (that is, secondary user cartridge of the main user), based on the active user information read out from the storage element 40. When there is a secondary user cartridge and the state of the secondary user cartridge satisfies the conditions for being used to printing, such as the residual toner amount in the cartridge is at or above a certain predetermined value, the procedure sets the secondary user cartridge as a usable cartridge (step S240) and terminates the usable cartridge determination process based on the residual toner amount. When multiple other cartridges are set as the secondary user cartridge in the active users information, a cartridge as a usable cartridge may be selected among the multiple cartridges in step S240 based on, for example, a pre-set priority sequence such as is shown in FIG. 8. For example, based on the priority sequence of the secondary user cartridges shown in FIG. 8, when the main user is user D, the cartridge 32A is preferentially selected as a usable cartridge than the cartridge 32B, among the secondary user cartridges of user D.

When the state of the secondary user cartridge does not satisfy the conditions for being used to printing, such as the residual toner amount in the cartridge is not at or above a certain predetermined value, while there is a secondary user cartridge for the main user, the procedure determines that there is no usable cartridge among the secondary user cartridges (step S250) and terminates the usable cartridge determination process based on the residual toner amount.

In the print execution process shown in FIG. 4, after the usable cartridge determination process based on the residual toner amount (step S50), the procedure determines whether there is any usable cartridge (step S60). When the result of the usable cartridge determination process based on the residual toner quantity (step S50) is positive, indicating that the main cartridge or another cartridge is set as the usable cartridge, the procedure sets the usable cartridge pertaining to this positive determination as an active cartridge (step S70), and executes the print job is using the active cartridge (step S80). When the result of the usable cartridge determination process based on the residual toner amount (step S50) is negative, indicating that there is no usable cartridge, the procedure outputs a warning of a printing error, insufficient toner, or the like to the client computer of the main user (step S92), and terminates the print execution process.

When the print job is completed using the active cartridge thus set, the procedure updates the toner usage information stored in the storage element 40 (step S90). The details of the toner usage information that are updated vary according to the content of the completed print job. When the main user executes the print job using the main cartridge, the toner usage information is updated without being changed. When the print job is executed using a cartridge other than the main cartridge, that is, another user's cartridge, for the purpose of offsetting the amount of the main cartridge's recording agent used by the another user, the toner usage information is updated so that the amount of toner used for the current print job is subtracted from the another user's toner usage amount of the main cartridge prior to execution of the print job and the another user's toner usage amount of the main cartridge is replaced by the amount obtained by the subtraction. Furthermore, when the print job is executed using a cartridge other than the main cartridge, that is, another user's cartridge; specifically, when the cartridge other than the main cartridge is borrowed for printing due to insufficient toner in the main cartridge, the toner usage information is updated so that the amount of toner used for the current print job is added to the main user's toner usage amount of the cartridge used for the print job, and the main use's toner usage amount of the toner cartridge used for the print job is replaced by the result of the addition.

At regular time intervals, the toner usage information stored in the storage element 40 is acquired by the host computer 100, the need for billing processing between users is determined, and billing processing is performed as needed.

In the printing device 20 which is used by multiple users via the network 90, a primary user is set for each of the multiple cartridges mounted in the printing device 20. This configuration allows for management of toner amount used by each user per cartridge, and the amount of toner used by each user for each cartridge, and simplifies management of the toner usage amount. In the printing device 20, a secondary user is set for at least some of the cartridges. This configuration allows for diversion of toner between multiple cartridges to a certain user. And execution of the print job can be immediately ensured without any print failures even if there is insufficient toner in the primary user cartridge, or another condition. Furthermore, even when there are heavy users and light users, the amount of toner used in the cartridges or the usage period thereof can be balanced to a certain degree, and the cartridges can be effectively utilized.

In the printing device 20 described above, the toner consumption by each user can be managed in terms of the toner cartridge for which the user is set as the primary user, and even when there is insufficient toner in the toner cartridge set for the primary user, the print job is executed using the toner of another recording agent cartridge for which the user is set as a secondary user. This configuration simplifies management of toner consumption of each user and allows adequate response to the occurrence of an insufficient residual amount of recording agent in the toner cartridge for which the user is set as the primary user.

When toner usage information indicates a secondary user used a cartridge, a primary user of the cartridge preferentially uses a cartridge for which the secondary user is set as the primary user, to execute a print job. The amount of toner used by another user can be promptly balanced out with toner that is currently on hand without performing billing processing. By this configuration, the toner usage amount that is subject to billing processing can be reduced among the users.

Therefore, by this printing device 20, when the recording agent cartridge of the primary user is used by a secondary user, the toner used by the secondary user is rapidly balanced out, management of toner consumption for each primary user cartridge can be maintained, and billing processing can be efficiently performed.

In this printing device 20, the toner usage information is updated after execution of printing. The toner usage amount is thus appropriately and rapidly balanced out based on the most updated toner usage information when a print job is received, and the occurrence of billing processing can be even more effectively reduced.

In the printing device 20 thus configured, the display input unit 42 in FIG. 1 corresponds to the user information inputting module; the CPU 51 for storing the information inputted via the display input unit 42 as active user information in the storage element 40 corresponds to the user information setting module; the CPU 51 for executing steps S30 through S70 in FIG. 4 corresponds to the active recording agent cartridge setting module; and the CPU 51 for executing step S80 in FIG. 4, the exposure unit 22, the developing unit 23, the primary transfer unit 25, the secondary transfer unit 28, the fixing unit 29, and the transport unit 27 correspond to the print execution module. The means for executing step S130 in FIG. 5 and steps S200, S210, S230, and other steps in FIG. 6, and detecting the residual amount of toner in the toner cartridges 32A through 32D corresponds to the residual amount deficiency detection module; the storage element 40 corresponds to the recording agent usage information storage module; and the CPU 51 for executing step S90 in FIG. 4 corresponds to the information updating module. Also, the four toner cartridges in the printing device 20 correspond to the multiple recording agent cartridges.

In the printing device 20 of the embodiment, the active user information setting means stores the active user information inputted from the display input unit 42, which is the active user information inputting means in the printing device 20, into the storage element 40 according to the command of the CPU 51 and read out the stored active user information into the RAM 62 during print execution process. In one embodiment, the active user information may be inputted by the host computer 100 or client computer 101 to the storage element 40, and read out into the RAM 62 during print execution process, or inputted to the storage element 40 in the printing device 20 by the host computer 100 or client computer 101 via the network 90, and read into the RAM 62 during print execution process. The active user information may also be acquired along with the user's print job by the printing device 20, and acquired in the RAM 62.

In the printing device 20 of the embodiment, when a user sends a print job and there are multiple usable cartridges for which other users are set as the primary users in the usable cartridge determination process based on usage information, the print job is executed preferentially using a cartridge of another user who has a large usage amount of a cartridge of the user who sent the print job. In one structure, a cartridge with a large residual amount of recording agent may be preferentially used among the usable cartridges. In another structure, a cartridge of another user who belongs to a division in a different billing segment may be preferentially used in order to minimize or simplify billing processing. In another structure, a cartridge which has the shortest the distance to the position to be used for executing the print job may be preferentially used, considering the cost of driving the cartridges. A priority sequence may also be determined in advance for the multiple cartridges.

In the usable cartridge determination process based on the residual toner amount by the printing device 20 of the embodiment, a cartridge used for printing is determined based on the pre-set priority sequence in the active user information. In one structure, a cartridge that has a large residual toner amount may be given priority, and the cartridge of another user belonging to the same or similar type of division, or the cartridge of another user belonging to a division in the same billing segment may be given priority in order to minimize or simplify billing processing. When another user's cartridge is used based on the residual toner amount, a maximum amount of toner diverted from another cartridge that a secondary user can use may also be set in advance. This configuration minimizes spikes in the amount of toner diverted by a specific user, and reduces billing processing. As a result, other cartridges can be used in the desired sequence of priority, and the amount of toner used can be efficiently managed.

In the printing device 20 of the embodiment, print execution process is executed all at once for a received print job. In one structure, the active cartridge may be set for each page of a print job. This configuration ensures reliable execution of the entire print job. In the printing device 20 of the embodiment, the entire amount of toner used for the received print job was balanced out by another cartridge determined by the usable cartridge determination process based on the usage information (step S30), or the toner of a cartridge determined by the usable cartridge determination process based on the residual toner amount (step S50) was used or diverted. In one structure, only a portion of the toner used for the print job may be balanced by another cartridge on the basis of the usage information, or may be diverted by another cartridge set for a secondary user based on the residual toner amount, or the user's own cartridge is used.

The printing device 20 of the embodiment is described as a monochrome laser printer, but is not limited to this configuration alone and may also be an inkjet printer or other form of printer, or in a copying device, facsimile device, or the like. The multiple cartridges provided to the printing device 20 are also not necessarily all of the same color, and are not necessarily black, and a primary user is also not necessarily set for all the cartridges. Two or more cartridges of the printing device 20 may contain interchangeable recording agents, a primary user may be set for these cartridges, and a secondary user may be set for some of the cartridges. A configuration was adopted in these embodiments whereby the CPU 51 was provided with EEPROM 71 and 72, but EPROM may also be used instead of EEPROM. The storage element 40 may also be inside the controller 50. The present invention was described as a printing device 20 in the abovementioned embodiments, but the present invention may also be a print management method, or a print management system provided with a host computer 100 and a network.

The above embodiment is to be considered in all aspects as illustrative and not restrictive. There may be many modifications, changes, and alterations in, for example, configuration of cartridge or allocation of users, without departing from the scope or spirit of the main characteristics of the present invention. All changes within the meaning and range of equivalency of the claims are therefore intended to be embraced therein.

What is claimed is:

1. A printing device which is connected to a network and which executes a print job, using any of multiple recording agent cartridges mounted therein, comprising:
   an active user information setting module that sets a primary user for each of the multiple recording agent cartridges and a secondary user for at least one of the recording agent cartridges, as active user information;
   a residual amount deficiency detection module that detects residual amount deficiency of toner for each of the multiple recording agent cartridges;
   an active recording agent cartridge setting module that, when a print job with user identification information is received from a user via the network, specifies a main recording agent cartridge for which the user is the primary user based on the active user information and the user identification information received with the print job, wherein
   in case where residual amount deficiency is not detected with respect to the main recording agent cartridge by said residual amount deficiency detection module, said active recording agent cartridge setting module sets the specified main recording agent cartridge as an active recording agent cartridge for print execution; and
   in case where residual amount deficiency is detected with respect to the main recording agent cartridge, said active recording agent cartridge setting module specifies secondary recording agent cartridges for which the user is a secondary user based on the active user information and the user identification information and sets one of the specified secondary recording agent cartridge as the active recording agent, and
   said printing device further comprising a print job execution module that executes the print job using the active recording agent cartridge; and
   a recording agent usage information storage module that stores recording agent usage information that includes cartridge identification information for identifying a main recording agent cartridge for which a user is the primary user, user identification information for identifying a user, and recording agent usage amount relation information relating to the amount of recording agent used in a print job, when the print job is executed by said print job execution module using the secondary recording agent cartridge as the active recording agent cartridge; wherein
   said active recording agent cartridge setting module, prior to the detection of residual amount deficiency with respect to the main cartridge by said residual amount deficiency detection module, judges whether recording agent usage information with respect to the main recording agent cartridge is stored in the recording agent usage information storage module, based on the cartridge identification information of the main recording agent cartridge, in case where recording agent usage information with respect to the main cartridge is stored in said recording agent usage information storage module, determines a recording agent cartridge for which a user corresponding to the user identification information included in the recording agent usage information is the primary user, based on the active user information and the recording agent usage information, and sets the determined recording agent as the active recording agent cartridge, and in case where recording agent usage information with respect to the main cartridge is not stored in said recording agent usage information storage module, determines whether the residual amount deficiency is detected with respect to the main recording agent cartridge to set the active recording agent cartridge.

2. The printing device according to claim 1, further comprising an information updating module that, after the active recording agent cartridge setting module sets the active recording agent cartridge and the print job execution module executes the print job using the active recording agent cartridge, updates the recording agent usage information stored in the recording agent usage information storage module with respect to the active recording agent cartridge based on details of the executed print job.

3. The printing device according to claim 1, wherein in case where multiple recording agent cartridges are provided as the secondary recording agent cartridges for the user, a priority sequence is set for use of the multiple recording agent cartridges.

4. The printing device according to claim 1, wherein the active recording cartridge setting module, in case where multiple recording agent cartridges are provided as the secondary recording agent cartridges for the user, preferentially select a recording agent cartridge for which a user having the same or similar type of attributes as the user who has sent the print job is the primary user, among the multiple cartridges, and set the selected recording agent cartridge as the active recording agent cartridge.

5. The printing device according to claim 1, wherein the active recording cartridge setting module, in case where multiple recording agent cartridges are provided as the secondary recording agent cartridges for the user, preferentially selects a recording agent cartridge which has the shortest distance to a preset position for a recording agent cartridge to be used for the print execution, and sets the selected recording agent cartridge as the active recording agent cartridge.

6. The printing device according to claim 1, wherein the active recording agent cartridge setting module sets an active recording agent cartridge for each page to be printed in the print job.

7. The printing device according to claim 1, further comprising an active user information inputting module that inputs the active user information.

8. A print management system comprising multiple terminal devices connected to a network, a printing device which is connected to the network and which executes a print job using any of multiple recording agent cartridges mounted therein, and a management device for managing the printing device, wherein said printing device includes:

an active user information setting module that sets a primary user for each of the multiple recording agent cartridges and a secondary user for at least one of the recording agent cartridges, as active user information;

an active user information acquiring module; a residual amount deficiency detection module that detects residual amount deficiency of toner for each of the multiple recording agent cartridges; an active recording agent cartridge setting module that, when a print job with user identification information is received from a user via the network, specifies a main recording agent cartridge for which the user is the primary user based on the active user information and the user identification information received with the print job, and in case where residual amount deficiency is not detected with respect to the main recording agent cartridge by said residual amount deficiency detection module, sets the specified main recording agent cartridge as an active recording agent cartridge for print execution, while in case where residual amount deficiency is detected with respect to the main recording agent cartridge, specifies secondary recording agent cartridges for which the user is a secondary user based on the active user information and the user identification information to set one of the specified secondary recording agent cartridge as the active recording agent; a print job execution module that executes the print job using the active recording agent cartridge; a recording agent usage information storage module that stores recording agent usage information that includes cartridge identification information for identifying a main recording agent cartridge for which a user is the primary user, user identification information for identifying a user, and recording agent usage amount relation information relating to the amount of recording agent used in a print job, when the print job is executed by said print job execution module using the secondary recording agent cartridge as the active recording agent cartridge; wherein said active recording agent cartridge setting module, prior to the detection of residual amount deficiency with respect to the main cartridge by said residual amount deficiency detection module, judges whether recording agent usage information with respect to the main recording agent cartridge is stored in the recording agent usage information storage module, based on the cartridge identification information of the main recording agent cartridge.

in case where recording agent usage information with respect to the main cartridge is stored in said recording agent usage information storage module, determines a recording agent cartridge for which a user corresponding to the user identification information included in the recording agent usage information is the primary user, based on the active user information and the recording agent usage information, and sets the determined recording agent as the active recording agent cartridge, and in case where recording agent usage information with respect to the main cartridge is not stored in said recording agent usage information storage module, determines whether the residual amount deficiency is detected with respect to the main recording agent cartridge to set the active recording agent cartridge.

9. A print management method for a printing device which is connected to a network and which executes a print job using any of multiple recording agent cartridges mounted therein, comprising the steps of:

detecting residual amount deficiency of toner for each of the multiple recording agent cartridges;

when a print job with user identification information is received from a user via the network, referring to the user identification information received with the print job and an active user information including settings of a primary user for each of the multiple recording agent cartridges and a secondary user for at least one of the recording agent cartridges, to specify a main recording agent cartridge for which the user is the primary user, and detecting residual amount deficiency of toner with respect to the specified main cartridge;

in case where residual amount deficiency is not detected with respect to the main recording agent cartridge, setting the specified main recording agent cartridge as an active recording agent cartridge for print execution; and in case where residual amount deficiency is detected with respect to the main recording agent cartridge, specifying secondary recording agent cartridges for which the user is a secondary user based on the active user information and the user identification information and setting one of the specified secondary recording agent cartridge as the active recording agent;

executing the print job using the active recording agent cartridge; and storing recording agent usage information that includes cartridge identification information for identifying a main recording agent cartridge for which a user is the primary user, user identification information for identifying a user, and recording agent usage amount relation information relating to the amount of recording agent used in a print job, when the print job is executed using the secondary recording agent cartridge as the active recording agent cartridge; wherein prior to the detecting the residual amount deficiency with respect to the main cartridge, judging whether recording agent usage information with respect to the main recording agent cartridge is stored, based on the cartridge identification information of the main recording agent cartridge, and in case where recording agent usage information with respect to the main cartridge is stored, determining a recording agent cartridge for which a user corresponding to the user identification information included in the recording agent usage information is the primary user, based on the active user information and the recording agent usage information, and setting the determined recording agent as the active recording agent cartridge, and in case where recording agent usage information with respect to the main cartridge is not stored, determining whether the residual amount deficiency is detected with respect to the main recording agent cartridge to set the active recording agent cartridge.

* * * * *